US009552050B2

(12) United States Patent
Miyasaka et al.

(10) Patent No.: US 9,552,050 B2
(45) Date of Patent: Jan. 24, 2017

(54) INFORMATION PROCESSING DEVICE, PRINTING DEVICE, AND CONTROL METHOD

(71) Applicant: Seiko Epson Corporation, Tokyo (JP)

(72) Inventors: Masayo Miyasaka, Shiojiri (JP); Youji Tsuchiya, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/719,713

(22) Filed: May 22, 2015

(65) Prior Publication Data

US 2015/0346805 A1  Dec. 3, 2015

(30) Foreign Application Priority Data

Jun. 2, 2014 (JP) ................................. 2014-113813
Jun. 2, 2014 (JP) ................................. 2014-113814
Mar. 9, 2015 (JP) ................................. 2015-045575

(51) Int. Cl.
*G06F 13/28* (2006.01)
*G06F 1/32* (2006.01)
*G06F 9/44* (2006.01)

(52) U.S. Cl.
CPC ........... *G06F 1/3284* (2013.01); *G06F 1/3293* (2013.01); *G06F 9/4418* (2013.01); *Y02B 60/1267* (2013.01)

(58) Field of Classification Search
None
See application file for complete search history.

(56) References Cited

U.S. PATENT DOCUMENTS

| | | | |
|---|---|---|---|
| 7,269,666 B1 * | 9/2007 | Leitner | H04L 1/1657 709/223 |
| 8,504,856 B2 * | 8/2013 | Tsuzuki | G06F 1/32 713/320 |
| 8,683,247 B2 * | 3/2014 | Lerman | G06F 1/3203 713/300 |
| 2002/0109857 A1 | 8/2002 | Ueno et al. | |

FOREIGN PATENT DOCUMENTS

| | | |
|---|---|---|
| JP | 2002-244834 A | 8/2002 |
| JP | 2003-122536 A | 4/2003 |
| JP | 2011-039715 A | 2/2011 |

\* cited by examiner

*Primary Examiner* — Idriss N Alrobaye
*Assistant Examiner* — Richard B Franklin

(57) ABSTRACT

An information processing device having plural control units appropriately executes an arbitration process when a control unit is hibernating (in power-saving mode) and transmits data correctly to an external device. The information processing device has a first CPU and a second CPU; a first memory embedded in a semiconductor chip including the first CPU and second CPU; and a second memory disposed externally to the semiconductor chip. The first CPU executes an arbitration process according to the type of event that occurred when the first CPU is in a first state, the second CPU and the second memory are in a second state different from the first state, and an event requiring sending data from the first memory to the second memory occurs.

15 Claims, 5 Drawing Sheets

|  | NORMAL OPERATING MODE | NETWORK STANDBY MODE | POWER-SAVING MODE | WFI MODE |
|---|---|---|---|---|
| FIRST CPU 101 | ○ | ○ | △ | × |
| SECOND CPU 102 | ○ | × | × | × |

INFORMATION PROCESSING DEVICE, PRINTING DEVICE, AND CONTROL METHOD

Priority is claimed under 35 U.S.C. §119 from Japanese patent application nos. JP 2014-113813, filed on Jun. 2, 2014, JP 2014-113814, filed on Jun. 2, 2014, and JP 2015-45575, filed on Mar. 9, 2015, which are hereby incorporated by reference in their entirety.

BACKGROUND

1. Technical Field

The present disclosure relates to an information processing device with a plurality of operating modes, and more particularly to information processing devices that can communicate appropriately with external devices.

2. Related Art

Electronic devices such as printers commonly have a power conservation mode to suppress unnecessary power consumption. For example, printers are typically designed to switch the operating mode to an energy saver mode when data requiring printing is not received for a specific period of time. When the printer is in the energy saver mode, the power supply to parts such as the print mechanism and the control unit is stopped appropriately.

While the controller in printers in other electronic devices normally has a single CPU, and the printing process and communication processes, for example, are controlled by the single CPU, devices having two CPUs to accelerate processing and save power have also been proposed.

However, when two CPUs are used, the circuitry becomes more complicated, and arbitration of processing by the two CPUs in each of the operating modes is required.

JP-A-2011-39715 discloses technology for arbitrating memory access from two CPUs.

When an operation request is received in the energy saver mode, the electronic device typically resumes the normal operating mode. Printers, for example, are designed to return to the normal operating mode when a print request is received, but there are various problems with the data reception process in the energy saver mode, including the amount of time required to resume the normal operating mode.

These problems are addressed by the following.

JP-A-2003-122536 describes cancelling the power-saving state of the memory when data is received from a host computer, storing the data in memory by DMA, and then cancelling the power-saving state of the CPU.

JP-A-2002-244834 describes the CPU setting the communication control information used to change from the power-saving mode to the normal transfer mode in the response control unit before entering the power-saving mode, and the response control unit resuming data reception based on the set communication control information when cancelling the power-saving mode without going through the CPU.

In a configuration with two CPUs, however, if one CPU goes into the hibernation state when in the power-saving mode, the other CPU must respond appropriately when a process related to the hibernating CPU occurs. This problem is not addressed by JP-A-2011-39715. It is particularly desirable that processes transmitting data to the external device execute correctly even in the power-saving mode.

JP-A-2003-122536 and JP-A-2002-244834 are silent about how the data reception process is executed in each operating mode in devices having an operating mode that changes the operating speed (clock rate) of the CPU in the printer or other controller (information processing device) in multiple levels.

When the CPU is operating at a low speed (low clock rate) in the power-saving mode, data transfers may not keep pace with data reception in the process whereby the received data is passed through by the CPU. The receive buffer of the reception circuit may therefore become full, and receiving the transmitted data may not be possible. The printer or other controller (information processing device) can therefore preferably adjust the operating mode of the CPU appropriately to the reception process.

An objective of the present invention is therefore to provide an information processing device that has multiple operating modes and can communicate appropriately with external devices in any operating mode. Another objective of the invention is to provide an information processing device that has plural control units and can appropriately execute an arbitration process to transmit data correctly to external devices when one of the control units enters a hibernation state (power-saving mode). Another objective of the invention is to provide an information processing device that can reliably receive data transmitted while the control unit is operating in a low speed mode.

SUMMARY

To achieve the foregoing objective, an information processing device according to one aspect of the invention has a data storage unit; a first control unit; and a second control unit. The first control unit processes data in the data storage unit when the operating mode is a first operating mode, and the second control unit processes data in the data storage unit when the operating mode is a second operating mode that is different from the first operating mode.

An information processing device according to another aspect of the invention preferably also has a first CPU and a second CPU; a first memory embedded in a semiconductor chip including the first CPU and second CPU; and a second memory disposed externally to the semiconductor chip. The first control unit includes the first CPU; the second control unit includes the second CPU; and the data storage unit includes the first memory. The first CPU executes an arbitration process according to the type of event that occurred when the first CPU is in a first state, the second CPU and the second memory are in a second state different from the first state, and an event requiring sending data from the first memory to the second memory occurs.

Further preferably, the first CPU executes the arbitration process by sending data from the first memory to the second memory when the event that occurred is a type one event; storing data to be sent from the first memory to the second memory in the first memory when the event that occurred is a type two event; and storing data to be sent from the first memory to the second memory in the first memory, and requesting the second CPU to enter the first state when the event that occurred is a type three event.

Further preferably, the first CPU updates already stored data when the event that occurred is a type two event.

Further preferably, the first CPU executes the arbitration process when the second CPU and second memory are changing to the first state or are changing to the second state.

Further preferably, the storage capacity and power consumption of the second memory are greater than the storage capacity and power consumption of the first memory.

Further preferably, the first CPU executes an operating system and program for the first CPU stored in the first memory; and the second CPU executes an operating system and program for the second CPU stored in the second memory.

Further preferably, the information processing device also has a data reception circuit. The second control unit includes a data transfer circuit; the first control unit transfers data received by the data reception circuit to the data storage unit when the operating mode is the first operating mode; and the data transfer circuit transfers data received by the data reception circuit to the data storage unit when the operating mode is the second operating mode.

Further preferably, the data transfer circuit transfers data without going through the first control unit.

Further preferably, the first control unit includes the first CPU; and the clock frequency of the first CPU in the second operating mode is lower than the clock frequency in the first operating mode.

Further preferably, the data reception circuit includes FIFO memory.

Further preferably, the information processing device has a third operating mode in which operation of the first CPU stops.

Another aspect of the invention is a printing device with multiple operating modes, the printing device including: a print unit; a data storage unit; a first control unit; and a second control unit. The first control unit processes data in the data storage unit when the operating mode is a first operating mode, and the second control unit processes data in the data storage unit when the operating mode is a second operating mode that is different from the first operating mode.

Preferably, the printing device also has a first CPU and a second CPU; a first memory embedded in a semiconductor chip including the first CPU and second CPU; and a second memory disposed externally to the semiconductor chip. The first control unit includes the first CPU; the second control unit includes the second CPU; the data storage unit includes the first memory. The first CPU executes an arbitration process according to the type of event that occurred when the first CPU is in a first state, the second CPU and the second memory are in a second state different from the first state, and an event requiring sending data from the first memory to the second memory occurs.

Further preferably, the first CPU executes the arbitration process by sending data from the first memory to the second memory when the event that occurred is a type one event unrelated to a printing process, storing data to be sent from the first memory to the second memory in the first memory when the event that occurred is a type two event that at least transmits information related to communication, and storing data to be sent from the first memory to the second memory in the first memory, and requesting the second CPU to enter the first state when the event that occurred is a type three event that receives a print request.

The printing device according to another aspect of the invention also preferably has a data reception circuit. The second control unit includes a data transfer circuit; the first control unit transfers data received by the data reception circuit to the data storage unit when the operating mode is the first operating mode; and the data transfer circuit transfers data received by the data reception circuit to the data storage unit when the operating mode is the second operating mode.

Further preferably, the first control unit includes the first CPU; and the clock frequency of the first CPU in the second operating mode is lower than the clock frequency in the first operating mode.

Another aspect of the invention is a control method of an information processing device with multiple operating modes, wherein: the information processing device has a data storage unit, a first control unit, and a second control unit; and the control method includes the first control unit processing data in the data storage unit when the operating mode is a first operating mode, and the second control unit processing data in the data storage unit when the operating mode is a second operating mode that is different from the first operating mode.

In a control method according to another aspect of the invention, the information processing device also has a first CPU and a second CPU, a first memory embedded in a semiconductor chip including the first CPU and second CPU, and a second memory disposed externally to the semiconductor chip. The first control unit includes the first CPU; the second control unit includes the second CPU; the data storage unit includes the first memory. The control method includes the first CPU executing an arbitration process according to the type of event that occurred when the first CPU is in a first state, the second CPU and the second memory are in a second state different from the first state, and an event requiring sending data from the first memory to the second memory occurs.

In a control method according to another aspect of the invention, the information processing device also has a data reception circuit, a data storage unit, and a data transfer circuit; the first control unit transfers data received by the data reception circuit to the data storage unit when the operating mode is the first operating mode; and the data transfer circuit transfers data received by the data reception circuit to the data storage unit when the operating mode is the second operating mode.

Other objects and attainments together with a fuller understanding of the invention will become apparent and appreciated by referring to the following description and claims taken in conjunction with the accompanying drawings.

DESCRIPTION OF EMBODIMENTS

Figures 1, 2:
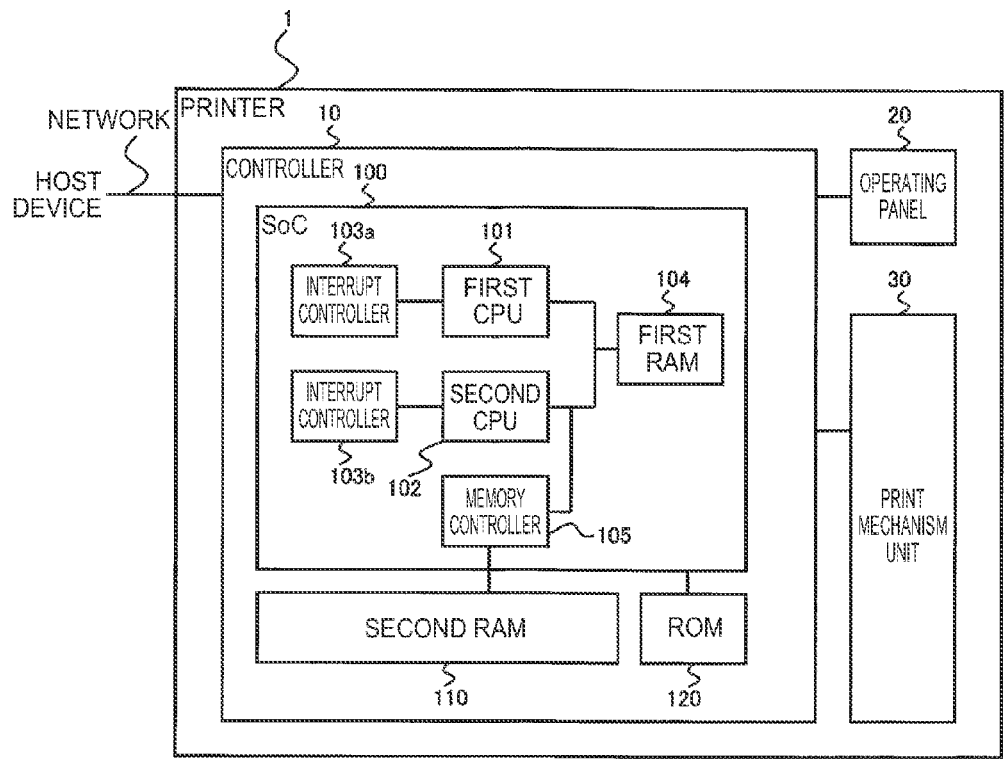
FIG. 1 illustrates the configuration of a printing device with an information processing device according to a first embodiment of the invention.
FIG. 2 shows operating modes of the printer 1.

Preferred embodiments of the present invention are described below with reference to the accompanying figures. The following embodiments do not limit the technical scope of the invention. Note that like or similar parts are identified by the same reference numerals or reference symbols in the accompanying figures.

Embodiment 1

FIG. 1 shows the configuration of a first embodiment of a printer 1 comprising an information processing device according to the invention. The printer 1 and controller 10 shown in FIG. 1 are respectively examples of a printing device and an information processing device according to this embodiment of the invention. The controller 10 includes a first CPU 101 (first control unit) and a second CPU 102 (second control unit) as examples of plural control units; first RAM 104 (data storage unit) as memory disposed in the SoC (system-on-a-chip) 100 including the first CPU 101 and second CPU 102; and second RAM 110 as memory disposed externally to the SoC 100. When the second CPU 102 and second RAM 110 are in the power-saving mode and an event that sends data to the second RAM 110 occurs, the first CPU 101 executes an arbitration process appropriately to the type of event. As a result, data transmission can be handled appropriately and data can be transmitted correctly to the external device even if part of the control system of the controller 10 is hibernating.

The printer 1 shown in FIG. 1 according to this embodiment is an example of an information processing device according to the invention, and is a printing device that can receive and print print data transmitted by wire or wirelessly through a network from a host device, which is an external device.

The host device is a personal computer in this example, and has a driver for the printer 1, a status monitor, and configuration utility not shown in the figures. The driver has functions for generating print data for the printer 1 and issuing print requests to the printer 1. The status monitor has functions for acquiring and displaying printer 1 status information for the user. The configuration utility has functions for configuring the printing conditions of the printer 1, for example, based on user input.

As shown in FIG. 1, the printer 1 has a controller 10, operating panel 20, and print mechanism unit 30 (print unit). The operating panel 20 provides the user interface of the printer 1, and includes a display device such as a flat panel display, and operating devices such as buttons. The print mechanism unit 30 is the portion that executes the printing process on paper or other print media as controlled by the controller 10. The printer 1 has plural operating modes as described further below.

As shown in FIG. 1, the controller 10 includes the SoC 100, second RAM 110, and ROM 120.

Function blocks (IP cores) of the SoC 100 include a first CPU 101, a second CPU 102, interrupt controllers 103a and 103b, first RAM 104, and memory controller 105.

The first CPU 101 is called a printer core, and controls mainly the printing process. When the second CPU 102 is hibernating and an event related to the second CPU 102 occurs, the first CPU 101 executes an appropriate arbitration process. Note that the printer 1 in this example is characterized by the arbitration process, the specific content of which is described further below.

The first CPU 101 operates according to a first operating system (OS), such as a real-time operating system (RTOS), that is loaded into the first RAM 104 upon startup, a printing program, and an arbitration program that are stored in ROM 120.

The second CPU 102 is called an application core, and mainly controls network communication processes. For example, the second CPU 102 handles transmitting status information to the host device, and checking if a communication link is opened with the host device.

The second CPU 102 operates according to a second operating system (OS), such as Linux (T), that is loaded into the second RAM 110 upon startup, and a communication program that are stored in ROM 120.

The interrupt controllers 103a and 103b apply interrupt processes to the first CPU 101 and second CPU 102, respectively, when the operating mode changes.

The first RAM 104 is internal memory (first memory) that is used by the first CPU 101 and is disposed in the SoC 100. The first RAM 104 consumes less power and has less storage capacity than the second RAM 110.

The memory controller 105 is the part that controls the second RAM 110.

The second RAM 110 is external memory (second memory) that is used by the second CPU 102 and disposed externally to the SoC 100. Compared with the first RAM 104, the second RAM 110 consumes more power and has greater storage capacity. The second RAM 110 therefore also enters the hibernation mode or low power consumption mode with the second CPU 102 when in the power-saving mode.

As described above, the ROM 120 is nonvolatile memory that stores the first OS, second OS, and other programs. These programs are loaded from the ROM 120 into RAM when the printer 1 power turns on.

The operating modes of the printer 1 are described next. FIG. 2 is a table showing examples of printer 1 operating modes. In FIG. 2, an open circle (O) indicates a first state (operating state), an X indicates a second state (power-saving mode), and a triangle (Ⓧ) indicates a third state (low-speed operating state).

The first state is the state in which the CPU operates at full capacity at full speed. The second state is the state in which the CPU operates at reduced capacity at an extremely low clock rate or stops operation. The third state is a low speed operating state in which the clock rate of the CPU is lower than in the first state but higher than in the second state. Power consumption by the CPU decreases and power conservation increases in the order first state (operating state), third state (low-speed operating state), second state (power-saving mode).

As shown in FIG. 2, the printer 1 has four operating modes: a normal mode (first operating mode), a power-saving mode (second operating mode), a network standby mode (third operating mode), and a WFI (wait for interrupt) mode (fourth operating mode).

The normal mode is the operating mode when the first CPU 101 and second CPU 102 are both in the first operating state, and in this mode the first CPU 101 and second CPU 102 execute processes (including the printing process and communication processes related to the printing process) executed during normal operation as a printer.

The network standby mode is the operating mode in which the first CPU 101 is in the first state and the second CPU 102 is in the second state. The second CPU 102 does not execute the network communication process in the network standby mode, and part of this communication process is handled by the first CPU 101. In the network standby mode, only a specifically limited process executes and power consumption is less than in the normal operating mode. This specifically limited process is part of a communication process not related to the printing process, for example, and may include a confirmation process determining if a network communication state is established.

In the power-saving mode, the first CPU 101 is in the third state and the second CPU 102 is in the second state. A specific process that is even more limited than the process executed in the network standby mode, such as monitoring sensor output, executes in the power-saving mode. In the power-saving mode, the clock frequency of the first CPU 101 is set lower than in the normal operating mode and the network standby mode. More specifically, the first CPU 101 executes processes at a slower speed than in the normal operating mode and the network standby mode.

The WFI mode is the operating mode in which the first CPU 101 and second CPU 102 are both in the second state. The WFI mode is a so-called sleep mode. In this operating mode processes are basically not executed and the first CPU 101 and second CPU 102 stop operating or operate at an extremely slow speed.

Note that when the second CPU 102 is in the second state, the second RAM 110 used by the second CPU 102 for processing also goes to the power-saving mode.

The first CPU 101 controls switching between these four operating modes according to predetermined specific conditions, and the operating mode is changed by the first CPU 101 when determined appropriate by the first CPU 101. When the operating mode changes, parts of the power supply control system not shown are controlled. The conditions for determining whether to change the operating mode (switching triggers) are determined based on receiving data, the type of data received, and the time past without assertion of an operating request. The printer 1 according to this embodiment changes the operating mode sequentially one mode at a time from the normal operating mode, to the network standby mode, power-saving mode, and WFI mode, or in the reverse sequence. For example, if the printer 1 is in the normal operating mode and print data is not received through the network for a specific time, the printer 1 changes to the network standby mode. If an operating request is then not received for a specific time while in the network standby mode, the printer 1 changes to the power-saving mode. If an operating request is then not received for a specific time while in the power-saving mode, the printer 1 changes to the WFI mode.

Figure 3:
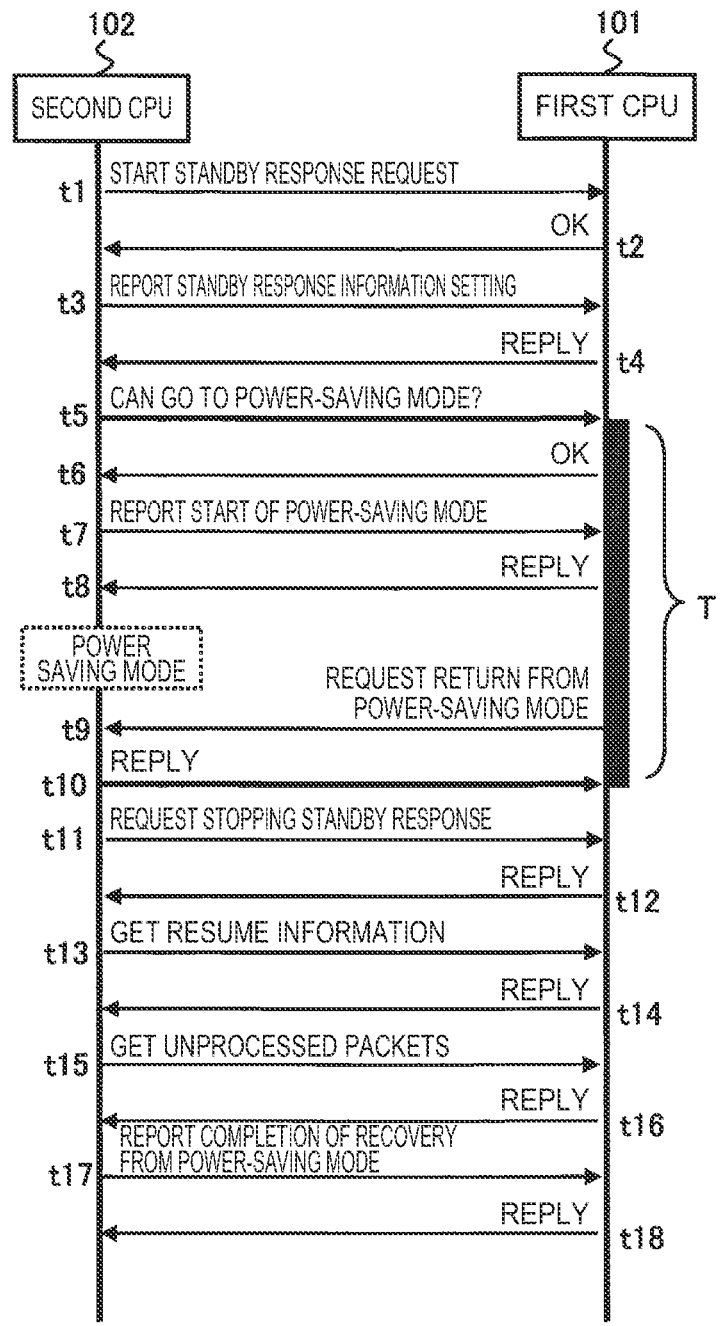
FIG. 3 is a timing chart showing an example of steps in the process of changing the operating mode of the printer 1.

A printer 1 according to this embodiment of the invention is characterized by the arbitration process when the second CPU 102 is in the second state and when the operating state changes, and the specific content of the arbitration process is described below. The arbitration process of the first CPU 101 is executed while in the network standby mode and when changing between the normal operating mode and network standby mode. The timing when the first CPU 101 executes the arbitration process is described first. FIG. 3 is a timing chart of exemplary steps in the process changing the operating mode.

When the printer 1 is in the normal operating mode and the condition for going from the normal operating mode to the network standby mode is satisfied, the second CPU 102 outputs a start standby response request to the first CPU 101 (t1). This condition is met when, for example, a user command to enter the network standby mode is received, or when a command to execute a process is not received through the network for a specific time. When such a request is received, the first CPU 101 starts the standby response system, and returns acknowledgement (OK) of starting the standby response to the second CPU 102 (t2).

When this response is received, the second CPU 102 reports the standby response information setting to the first CPU 101 (t3). Based on this report, the first CPU 101 sets the standby response information, and returns (replies) completion of the setting (t4). Upon receiving this response, the second CPU 102 outputs to the first CPU 101 a request to confirm if the power-saving mode (off state or low power consumption state) can be entered (t5).

If the controller 10 returns OK indicating the power-saving mode can be entered in response to this request (t6), the second CPU 102 reports starting to enter the power-saving mode (t7). When a confirmation reply is received from the first CPU 101 in response to this report (t8), the second CPU 102 enters the power-saving mode (enters the second state).

Thereafter, the printer 1 operates in the network standby mode, and when a condition for returning from the network standby mode to the normal operating mode is met, the first CPU 101 requests the second CPU 102 to change (return) from the power-saving mode. This condition is met, for example, when print data is received from the host device.

The second CPU 102 receives this request (t9), starts returning from the power-saving mode, and reports the same to the first CPU 101 (t10). The second CPU 102 then requests the first CPU 101 to stop the standby response (t11). In response to this request, the first CPU 101 stops the standby response and replies to the second CPU 102 (t12). Receiving this response, the second CPU 102 requests resume information (required information when resuming the normal operating mode) from the first CPU 101 (t13). In response to this request, the first CPU 101 returns the resume information to the second CPU 102 (t14), and the second CPU 102 thus acquires the resume information. Next, the second CPU 102 requests unprocessed packets (data to be processed in the normal operating mode) from the first CPU 101 (t15). The first CPU 101 then returns the unprocessed packets in response to the request (t16), and the second CPU 102 thus acquires the unprocessed packets. Next, the second CPU 102 reports completing resuming the normal operating mode from the power-saving mode (t17), and the first CPU 101 then acknowledges receiving the report (t18).

As described above, the printer 1 according to this embodiment changes between a normal operating mode and a network standby mode, and the first CPU 101 executes an arbitration process during period T in FIG. 3. More specifically, while going from the normal operating mode to the network standby mode (t5 to t8 in FIG. 3), while in the network standby mode (t8 to t9 in FIG. 3), and while going from the network standby mode to the normal operating mode (t9 to t10 in FIG. 3), the first CPU 101 arbitrates appropriately for processes of the second CPU 102, that is, processes that send data to the second RAM 110 in the normal operating mode.

Figure 4:
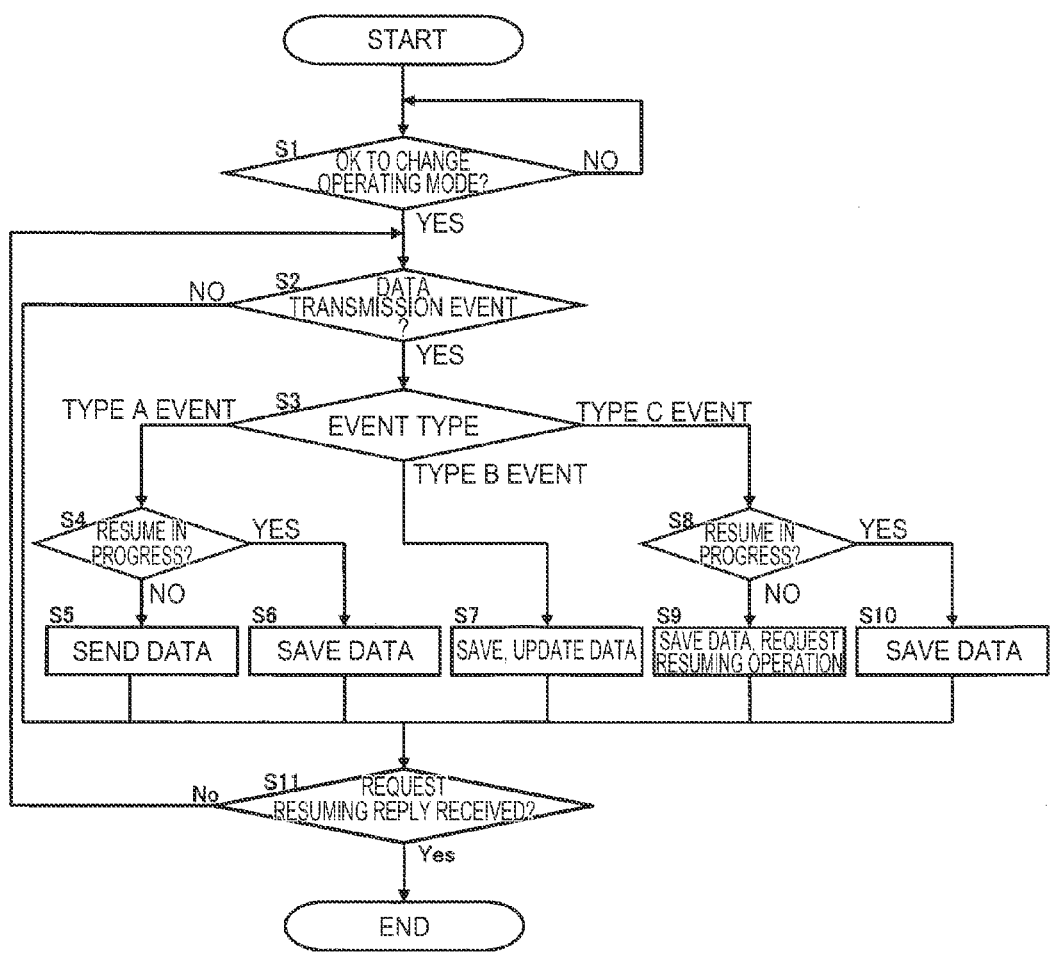
FIG. 4 is a flow chart of exemplary steps in the arbitration process of the printer 1.

The content of the arbitration process run by the first CPU 101 is described next. FIG. 4 is a flow chart showing exemplary steps in this arbitration process. Note that this arbitration process is controlled according to the arbitration program described above.

First, the first CPU 101 waits until the printer 1 starts going from the normal operating mode to the network standby mode. More specifically, the first CPU 101 waits to receive a power-saving mode transition query (t5 in FIG. 3) from the second CPU 102 (step S1 in FIG. 4). When a power-saving mode transition query is received, the first CPU 101 returns OK if the operating mode may be changed (step S1 returns YES in FIG. 4), and starts the arbitration process.

The first CPU 101 then waits until a response (t10 in FIG. 3) to the request to return from the power-saving mode is received from the second CPU 102, that is, waits until the arbitration process execution period ends unless an event that requires the arbitration process occurs (step S2 returns No and step S11 returns No in FIG. 4). An event requiring the arbitration process is an event involving information that should be sent to the second CPU 102, or more specifically is an event that sends data to the second RAM 110.

When an event requiring an arbitration process occurs, the first CPU 101 changes the arbitration method based on the type of event that occurred. More specifically, the first CPU 101 executes the arbitration process according to the event type.

If the event that occurred is an event of type A (first event type) (step S3 returns Type A Event in FIG. 4), the first CPU 101 basically executes the process on behalf of the second CPU 102.

A Type A Event is an event, such as a communication process, unrelated to the printing process, including events requiring a response from the host device or other external device confirming that a communication link to the printer 1 is open, and events returning status information in response to status requests from the host.

If the steps returning from the network standby mode to the normal operating mode (t9 to t10 in FIG. 3) are not executing when a Type A Event occurs (step S4 returns No in FIG. 4), the first CPU 101 executes the process itself as described above. More specifically, the first CPU 101 executes the transmissions process (communication process) to send the requested information (step S5 in FIG. 4). For example, the first CPU 101 sends the requested information to the host.

However, if operation is returning to the normal operating mode (step S4 returns Yes in FIG. 4), the data to be processed (transmitted) is stored in first RAM 104 for processing by the second CPU 102 after resuming the normal operating mode (step S6 in FIG. 4). After the period of the arbitration process ends, the data is sent by the first CPU 101 from first RAM 104 to second RAM 110.

If the event is a Type B Event (second event type) (step S3 in FIG. 4 returns Type B Event), the first CPU 101 saves (stores) the data to be sent to the second RAM 110 in first RAM 104 (step S7 in FIG. 4). Note that if the same type of data is already stored, the stored data is updated with the current data.

A Type B Event is an event that sends status information related to communication or other data stored in second RAM 110 to the host, and is an event that may be processed by the second CPU 102 after returning to the normal operating mode. A Type B Event is also an event that only needs to transmit the most recent information.

After the arbitration process ends, the stored data is transmitted by the first CPU 101 from the first RAM 104 to the second RAM 110.

If the event is a Type C Event (third event type) (step S3 in FIG. 4 returns Type C Event), the first CPU 101 basically saves the data required for processing, and executes a process to return the second CPU 102 to the normal operating mode to execute the process.

A Type C Event is an event that occurs when, for example, a print request is received from the host, a reset button on the operating panel 20 of the printer 1 is operated, or an operation that turns the printer 1 power off occurs, and is an event that requires returning the second CPU 102 to the normal operating mode for processing.

When a Type C Event occurs, and operation is returning from the power-saving mode to the normal operating mode at that time (t9 to t10 in FIG. 3) (step S8 in FIG. 4 returns No), the first CPU 101 saves (stores) the data to pass to the second CPU 102 (data to sent to the second RAM 110), and requests the second CPU 102 to return from the power-saving mode (step S9 in FIG. 4). In other words, the first CPU 101 asserts the request shown in t9 in FIG. 3.

If when a Type C Event occurs operation is returning from the network standby mode to the normal operating mode (step S8 in FIG. 4 returns Yes), the first CPU 101 saves (stores) the data to pass to the second CPU 102 (data to sent to the second RAM 110) (step S10 in FIG. 4). In this event, the second CPU 102 is returning to the normal operating mode and there is no need to request returning to the normal operating mode as described above.

The stored data (steps S9, S10) is then transmitted by the first CPU 101 from the first RAM 104 to the second RAM 110 after the arbitration process ends.

When processing the event that occurred thus ends, the first CPU 101 repeats the process from step S2 until a response (t10 in FIG. 3) to the request for the second CPU 102 to resume operation from the power-saving mode is received (step S11 in FIG. 4 returns NO), that is, until the arbitration process ends.

The first CPU 101 then ends the arbitration process when a response confirming resuming operation from the power-saving mode of the second CPU 102 (t10 in FIG. 3) is received (step S11 in FIG. 4 returns YES).

After the arbitration process ends, the printer 1 processes the received data and executes the printing process with the print mechanism unit 30 in the normal operating mode if the data received during the arbitration process relates to a print request from the host device.

As described above, if the second CPU 102 is changing to the power-saving mode, is in the power-saving mode, or is returning from the power-saving mode when an event related to the second CPU 102 occurs in a printer 1 according to the first embodiment of the invention, the first CPU 101 executes an arbitration process appropriately to the type of event that occurred. Therefore, if the second CPU 102 is in the power-saving mode and the first CPU 101 can respond appropriately, an operating mode that puts one CPU into a power-saving mode can be desirably applied and power consumption can be desirably reduced even in devices having two CPUs.

More specifically, because the first CPU 101 substitutes for the second CPU 102 and executes communication processes that require an immediate response, and data that the second CPU 102 sends to the host after resuming the normal operating mode is stored appropriately by the first CPU 101, normal communication is possible even in an operating mode that puts the second CPU 102 into a power-saving mode.

Furthermore, by putting the second CPU 102, which uses high capacity second RAM 110, into a power-saving mode, the second RAM 110 can also be put to sleep for significant energy savings.

A printer 1 according to this embodiment of the invention as described above achieves both high speed processing and efficient power conservation using two CPUs.

Note that the first embodiment of the invention is described as a device with two CPUs, but the invention is not so limited and can be applied to devices having three or more CPUs.

Embodiment 2

Figure 5:
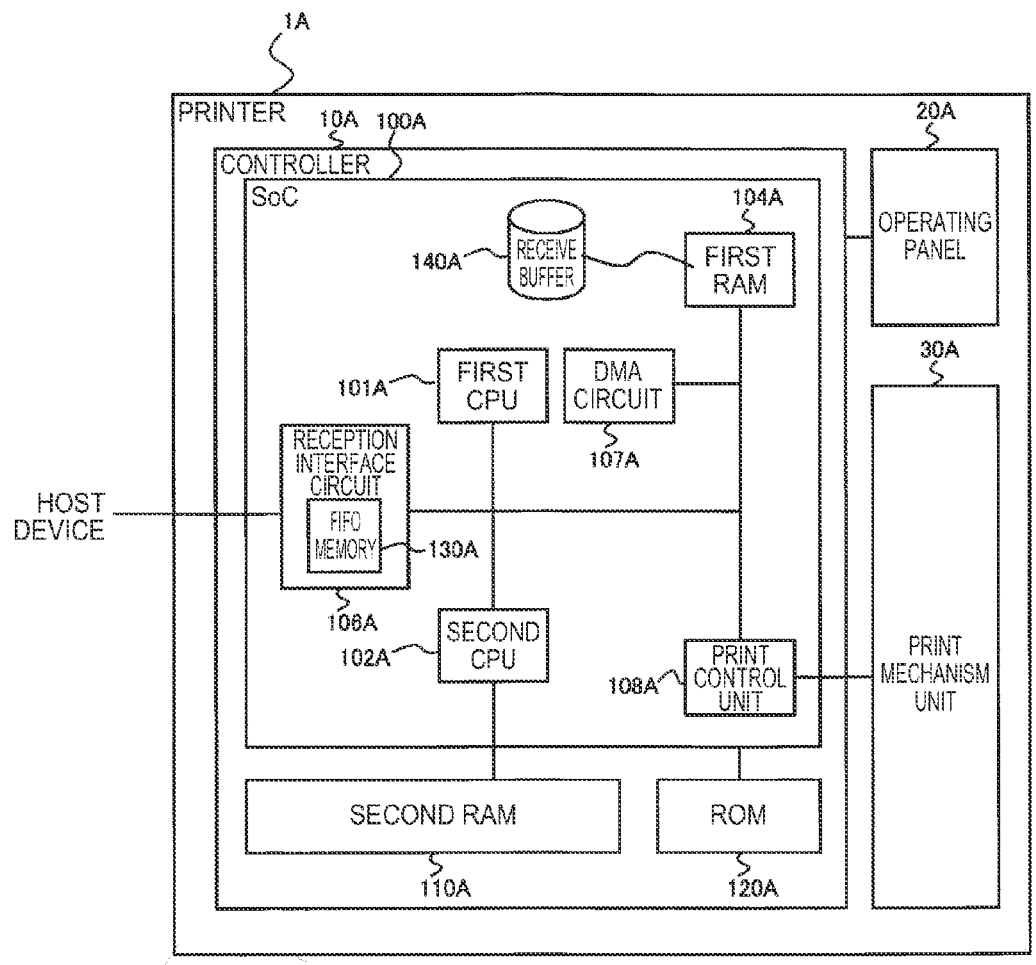
FIG. 5 illustrates the configuration of a printing device according to a second embodiment of the invention.

FIG. 5 is a block diagram illustrating the configuration of a printer 1A according to a second embodiment of the invention.

The printer 1A shown in FIG. 5 is an example of a printing device according to the invention, and the controller 10A thereof is an example of an information processing device according to the invention. The controller 10A in this example uses the first CPU 101A to transfer data received by the printer 1A to the receive buffer 140A (data storage unit) when the first CPU 101A (first control unit) is operating in the high speed mode (first state), controls a DMA circuit 107A (second control unit, data relay circuit) to handle data transfers to the receive buffer 140A when the first CPU 101A is operating in the low speed mode (third state), and thus executes the data reception process reliably in each operating mode of the printer 1A.

The printer 1A according to the second embodiment of the invention shown in FIG. 5 is an example of an information processing device according to the invention, and is a printing device that receives and prints print data transmitted from a host device over a network. As in the first embodiment, this printer 1A has four operating modes, that is, the operating modes of the first CPU 101A and second CPU 102A shown in FIG. 2. The first CPU 101A operates at a high clock rate (first state) in the normal operating mode (first operating mode) or network standby mode (third operating mode), and the first CPU 101A operates at a low clock rate (third state) in the power-saving mode (second operating mode).

The host device is a personal computer in this example, and has a driver for the printer 1A, a status monitor, and configuration utility not shown in the figures. The driver has functions for generating print data for the printer 1A and issuing print requests to the printer 1A. The status monitor has functions for acquiring and displaying printer 1A status information for the user. The configuration utility has functions for configuring the printing conditions of the printer 1A, for example, based on user input.

As shown in FIG. 5, the printer 1A has a controller 10A, operating panel 20A, and print mechanism unit 30A.

The controller 10A is the part that controls the operation of other parts of the printer 1A, and as shown in FIG. 5 includes a SoC 100A, second RAM 110A, and ROM 120A.

The function blocks (IP cores) of the SoC 100A are as shown in FIG. 5. The reception interface circuit 106A (data reception circuit) is a circuit that receives data transmitted from the host device, and is embodied by an ASIC (application specific integrated circuit). The reception interface circuit 106A includes internal FIFO (First In, First Out) memory 130A where the received data is stored. The storage capacity of the FIFO memory 130A is relatively small, such as 32 bytes.

The first CPU 101A is a control unit that executes processes according to control programs stored in ROM 120A. These processes are mainly printing processes.

The second CPU 102A is a control unit that executes processes according to control programs stored in ROM 120A. These processes are mainly network communication processes.

The first RAM 104A is a storage unit for temporarily storing data, and includes the receive buffer 140A reserved therein. The receive buffer 140A is a data buffer that stores data received through the reception interface circuit 106A until the data is processed.

The DMA circuit 107A is a circuit that transfers data by DMA (direct memory access) without going through the first CPU 101A.

The print control unit 108A is a circuit that transfers print data received by the printer 1A to the print mechanism unit 30A as print job execution data for the print mechanism unit 30A, and in this embodiment is an ASIC.

The second RAM 110A is RAM for the second CPU 102A.

The ROM 120A is a storage unit that stores the control programs.

The operating panel 20A provides the user interface of the printer 1A, and includes a display device such as a flat panel display, and operating devices such as buttons.

The print mechanism unit 30A is the portion that executes the printing process on paper or other print media as controlled by the controller 10A. If an inkjet printing method is used, the print mechanism unit 30A also has a head unit with nozzles for ejecting ink, and a conveyance unit that conveys the print media.

As described above, when print data requesting printing (a print request) is sent from the host device, the printer 1A thus comprised stores the print data through the reception interface circuit 106A to the receive buffer 140A. The stored print data is thereafter read sequentially, processed by the first CPU 101A, and the processed data is then sent to the print control unit 108A. The print control unit 108A generates print execution data from the transferred data and sends the print execution data to the print mechanism unit 30A. The print mechanism unit 30A then executes the printing process on the print medium according to the transmitted data.

The printer 1A likewise stores status information request commands and other control commands from the host in the receive buffer 140A. The stored print data is then processed appropriately by the first CPU 101A. In the case of a status information request command, the required information is acquired and the status information is then sent to the host by a process of the first CPU 101A.

Data sent from the host to the printer 1A is thus first received by the reception interface circuit 106A, then stored in FIFO memory 130A, sequentially transferred to the receive buffer 140A, and then processed.

As described above, the printer 1A has plural operating modes. In the normal operating mode and network standby mode, the first CPU 101A executes processes faster than in the power-saving mode. Note that the operating mode is changed in the same way as in the first embodiment. Information identifying the operating mode at that time is also stored in the first RAM 104A.

While processes are executed by the printer 1A as thus described, the printer 1A is characterized by the data transfer process when data is received by the reception interface circuit 106A, and the content of this process is described below.

Figure 6:
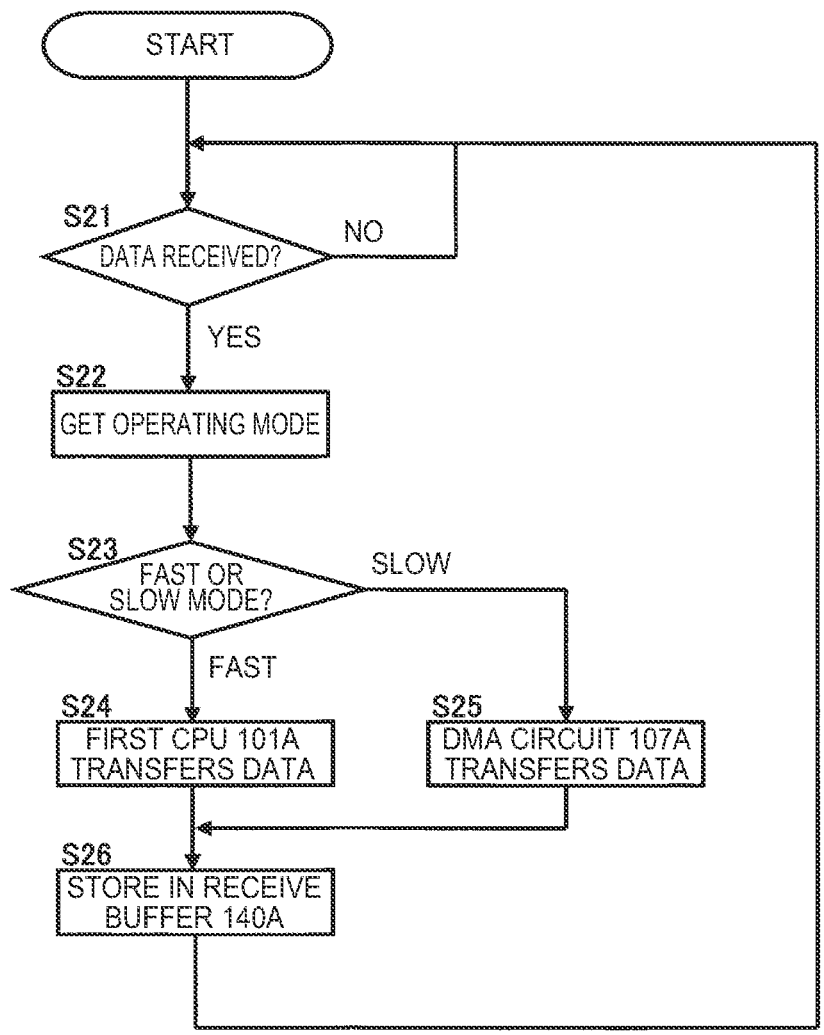
FIG. 6 is a flow chart of exemplary steps in the data transfer process in a printer 1A according to the second embodiment of the invention.

FIG. 6 is a flow chart showing steps in the data transfer process. The reception interface circuit 106A waits to receive data from the host (step S21 in FIG. 6). When data is received (step S21 in FIG. 6 returns YES), the reception interface circuit 106A stores the received data in the FIFO memory 130A, and gets the operating mode at that time (step S22 in FIG. 6). More specifically, the reception interface circuit 106A acquires the operating mode information stored in the first RAM 104A as described above to get the operating mode stored at that time.

As a result, if the operating mode at that time was the normal operating mode or the network standby mode (step S23 in FIG. 6 returns FAST), the reception interface circuit 106A informs the first CPU 101A that data was received. The first CPU 101A then executes the data transfer process as an interrupt process (step S24 in FIG. 6). More specifically, the first CPU 101A reads the data stored in the FIFO memory 130A sequentially one byte at a time, transfers the data to the receive buffer 140A, and stores the data in the receive buffer 140A.

If the operating mode at that time was the power-saving mode (step S23 in FIG. 6 returns SLOW), the reception interface circuit 106A requests the DMA circuit 107A for a data transfer process, and the DMA circuit 107A executes the data transfer process (step S25 in FIG. 6). More specifically, the DMA circuit 107A sequentially reads the data stored in the FIFO memory 130A, transfers the read data to the receive buffer 140A without going through the first CPU 101A, and stores the data in the receive buffer 140A. Note that the DMA circuit 107A can execute the data transfer process at a higher speed than data transfer by the first CPU 101A operating at the clock rate used in the power-saving mode.

Data received by the reception interface circuit 106A is thus transferred to and stored in the receive buffer 140A by either method (step S26 in FIG. 6).

After the data is stored in the receive buffer 140A, the stored data is processed sequentially.

The foregoing process is executed each time data is received. Note that because the printer 1A changes to a mode other than the WFI mode (third operating mode) as described above when data is received, the printer 1A is operating in the normal operating mode, network standby mode, or power-saving mode when step S23 executes.

Note that the operating mode is changed (shifted) one mode at a time in the foregoing embodiments, but operation may change directly from the WFI mode to the normal operating mode.

As described above, with the controller 10A of the printer 1A according to the second embodiment of the invention, transferring the received data to the receive buffer 140A is processed by the first CPU 101A when the operating mode is set to the normal operating mode or network standby mode, and is processed by the DMA circuit 107A when the operating mode is set to the power-saving mode, when data is received from a host device. As a result, the data transfer process becoming unable to keep pace with data reception because the first CPU 101A is operating at a low clock rate and processing is slow, that is, becoming unable to receive the next data because the FIFO memory 130A is full, can be reliably prevented even in the power-saving mode. Note that the data transfer process of the first CPU 101A in the normal operating mode and network standby mode, and the data transfer process of the DMA circuit 107A in the power-saving mode, are designed so that the processing speed is sufficient for data transfer to keep pace with data reception.

Therefore, in a printer 1A having a plurality of operating modes in which CPUs operate at different speeds, the reception process can be executed reliably in each operating mode without losing data sent from the host device.

Note that the invention can apparently be applied to electronic devices other than printing devices.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. An information processing device with multiple operating modes, comprising:
a reception interface circuit including a first-in-first-out (FIFO) memory in which data sent from a host is first received and stored;
a data storage;
a controller; and
a dynamic memory access (DMA) circuit;
the controller reading data stored in the FIFO memory sequentially and transferring the data to, and storing the data in, the data storage when the operating mode is a first operating mode in which the controller is operating in a high speed state, and
the DMA circuit reading data stored in the FIFO memory sequentially without going through the controller, and transferring and storing the data in the data storage when the operating mode is a second operating mode in which the controller is operating in a low speed state.

2. The information processing device described in claim 1, further comprising:
a first CPU and a second CPU;
a first memory embedded in a semiconductor chip including the first CPU and second CPU; and
a second memory disposed externally to the semiconductor chip;
the controller including the first CPU;
the data storage including the first memory; and
the first CPU executing an arbitration process according to the type of event that occurred when the first CPU is operating in the high speed state, the second CPU and the second memory are operating in a low speed state, and an event requiring sending data from the first memory to the second memory occurs.

3. The information processing device described in claim 2, wherein:
the first CPU executes the arbitration process by
sending data from the first memory to the second memory when the event that occurred is a type one event,
storing data to be sent from the first memory to the second memory in the first memory when the event that occurred is a type two event, and
storing data to be sent from the first memory to the second memory in the first memory, and requesting the second CPU to enter a high speed state when the event that occurred is a type three event.

4. The information processing device described in claim 3, wherein:
the first CPU updates already stored data when the event that occurred is a type two event.

5. The information processing device described in claim 2, wherein:
the first CPU executes the arbitration process when the second CPU and second memory are changing to the high speed state or are changing to the low speed state.

6. The information processing device described in claim 2, wherein:
the storage capacity and power consumption of the second memory are greater than the storage capacity and power consumption of the first memory.

7. The information processing device described in claim 2, wherein:
the first CPU executes an operating system and program for the first CPU stored in the first memory; and
the second CPU executes an operating system and program for the second CPU stored in the second memory.

8. The information processing device described in claim 1, wherein:
the controller includes the first CPU; and
the clock frequency of the first CPU in the second operating mode is lower than the clock frequency in the first operating mode.

9. The information processing device described in claim 1, further comprising:
a third operating mode in which operation of the first CPU stops.

10. A printing device with multiple operating modes, comprising:
a print unit;

a reception interface circuit including a first-in-first-out (FIFO) memory in which data sent from a host is first received and stored;
a data storage;
a controller; and
a dynamic memory access (DMA) circuit;
the controller reading data stored in the FIFO memory sequentially and transferring the data to, and storing the data in, the data storage when the operating mode is a first operating mode in which the controller operating in a high speed state, and
the DMA circuit reading data stored in the FIFO memory sequentially without going through the controller, and transferring and storing the data in the data storage when the operating mode is a second operating mode in which the controller is operating in a low speed state.

11. The printing device described in claim 10, further comprising:
a first CPU and a second CPU;
a first memory embedded in a semiconductor chip including the first CPU and second CPU; and
a second memory disposed externally to the semiconductor chip;
the controller including the first CPU;
the data storage including the first memory; and
the first CPU executing an arbitration process according to the type of event that occurred when the first CPU is operating in the high speed state, the second CPU and the second memory are operating in a low speed state, and an event requiring sending data from the first memory to the second memory occurs.

12. The printing device described in claim 11, wherein:
the first CPU executes the arbitration process by
sending data from the first memory to the second memory when the event that occurred is a type one event unrelated to a printing process,
storing data to be sent from the first memory to the second memory in the first memory when the event that occurred is a type two event that at least transmits information related to communication, and
storing data to be sent from the first memory to the second memory in the first memory, and requesting the second CPU to enter a high speed state when the event that occurred is a type three event that receives a print request.

13. The printing device described in claim 10, wherein:
the controller includes the first CPU; and
the clock frequency of the first CPU in the second operating mode is lower than the clock frequency in the first operating mode.

14. A control method of an information processing device with multiple operating modes, wherein:
the information processing device has a reception interface circuit including a first-in-first-out (FIFO) memory to which data sent from a host is first received and stored, a data storage, a contoller, and a dynamic memory access (DMA) circuit, and the control method includes
the controller reading data stored in the FIFO memory sequentially and transferring the data to, and storing the data in, the data storage when the operating mode is a first operating mode in which the controller is in a high speed state, and
the DMA circuit reading data stored in the FIFO memory sequentially without going through the controller and transferring the data to, and storing the data in, the data storage when the operating mode is a second operating mode in which the controller is operating in a low speed state.

15. The control method described in claim 14, wherein:
the information processing device has a first CPU and a second CPU, a first memory embedded in a semiconductor chip including the first CPU and second CPU, and a second memory disposed externally to the semiconductor chip;
the controller includes the first CPU;
the data storage includes the first memory; and
the control method includes the first CPU executing an arbitration process according to the type of event that occurred when the first CPU is in the high speed state, the second CPU and the second memory are in a low speed state, and an event requiring sending data from the first memory to the second memory occurs.

* * * * *